(12) United States Patent
Konita (10) Patent No.: US 12,531,954 B2
(45) Date of Patent: Jan. 20, 2026

(54) INFORMATION PROCESSING APPARATUS, NON-TRANSITORY COMPUTER READABLE MEDIUM STORING PROGRAM, AND INFORMATION PROCESSING METHOD FOR NOTIFYING UNAUTHORIZED OPERATIONS

(71) Applicant: FUJIFILM Business Innovation Corp., Tokyo (JP)

(72) Inventor: Naoya Konita, Kanagawa (JP)

(73) Assignee: FUJIFILM Business Innovation Corp., Tokyo (JP)

(\*) Notice: Subject to any disclaimer, the term of this patent is extended or adjusted under 35 U.S.C. 154(b) by 465 days.

(21) Appl. No.: 17/892,101

(22) Filed: Aug. 21, 2022

(65) Prior Publication Data

US 2023/0291850 A1 Sep. 14, 2023

(30) Foreign Application Priority Data

Mar. 8, 2022 (JP) .................. 2022-035162

(51) Int. Cl.
*H04N 1/00* (2006.01)
*H04N 1/44* (2006.01)

(52) U.S. Cl.
CPC ..... *H04N 1/00344* (2013.01); *H04N 1/00204* (2013.01); *H04N 1/00925* (2013.01); *H04N 1/4433* (2013.01)

(58) Field of Classification Search
CPC .......... H04N 1/00344; H04N 1/00204; H04N 1/00925; H04N 1/4433; G05B 2219/24001; G06F 16/21
See application file for complete search history.

(56) References Cited

U.S. PATENT DOCUMENTS

| 6,845,148 | B1* | 1/2005 | Beamon | H04M 3/2254 |
| | | | | 379/9 |
| 2009/0135698 | A1* | 5/2009 | Fujibayashi | G06F 11/325 |
| | | | | 369/53.42 |
| 2016/0373593 | A1* | 12/2016 | Sone | H04N 1/00477 |
| 2017/0034369 | A1* | 2/2017 | Iwashima | H04N 1/00344 |

FOREIGN PATENT DOCUMENTS

JP 6690674 4/2020

\* cited by examiner

*Primary Examiner* — Juan M Guillermety
(74) *Attorney, Agent, or Firm* — JCIPRNET (57) ABSTRACT

An information processing apparatus includes a processor configured to acquire information about an item of a maintenance work applied for from a maintenance worker, and refer to information in which the acquired item of the maintenance work is associated with an operation content performed in the maintenance work, and notify a manager user using a predetermined method in a case where an operation other than an operation corresponding to the item of the maintenance work applied for is performed.

20 Claims, 9 Drawing Sheets

| ITEM OF MAINTENANCE WORK | WORK PROCEDURE | | | | UPDATED DATA ITEM | | | |
|---|---|---|---|---|---|---|---|---|
| | 1 | 2 | 3 | ... | 1 | 2 | 3 | ... |
| TONER REPLACEMENT | TONER INSTALLATION | COPYING | CORRECTION CHART PRINTING | ... | TONER DATA | - | 3 | ... |
| DRUM REPLACEMENT | DRUM INSTALLATION | OPERATION X | - | ... | DRUM DATA | SYSTEM DATA A | - | ... |
| IMAGE QUALITY ADJUSTMENT | CORRECTION CHART PRINTING | IMAGE QUALITY CORRECTION | - | ... | - | SYSTEM DATA B | - | ... |
| ... | | | | | | | | |

FIG. 5

USER NAME: USER A (MAINTENANCE WORKER)

10/18/2021  14:25:18  LOGIN

10/18/2021  14:30:25  TONER INSTALLATION

10/18/2021  14:30:28  TONER DATA UPDATE (SERIAL NUMBER: xxx, REMAINING AMOUNT: 100%)

10/18/2021  14:33:42  COPYING (SIZE: A4, MAGNIFICATION: 100%, COLOR: BLACK AND WHITE, NUMBER OF SHEETS: 1)

10/18/2021  14:35:14  CORRECTION CHART PRINTING

10/18/2021  14:43:35  LOGOUT

FIG. 6

USER NAME: USER A (MAINTENANCE WORKER)

10/18/2021  14:25:18  LOGIN

10/18/2021  14:30:25  TONER INSTALLATION

10/18/2021  14:30:28  TONER DATA UPDATE (SERIAL NUMBER: xxx, REMAINING AMOUNT: 100%)

10/18/2021  14:33:42  COPYING (SIZE: A4, MAGNIFICATION: 100%, COLOR: BLACK AND WHITE, NUMBER OF SHEETS: 1)

10/18/2021  14:36:55  REFERRING TO SYSTEM DATA C

FIG.7

| APPARATUS ID | ITEM OF MAINTENANCE WORK | WORK PROCEDURE | | | | UPDATED DATA ITEM | | | |
|---|---|---|---|---|---|---|---|---|---|
| | | 1 | 2 | 3 | ... | 1 | 2 | 3 | ... |
| ID1 | TONER REPLACEMENT | TONER INSTALLATION | COPYING | CORRECTION CHART PRINTING | ... | TONER DATA | - | - | ... |
| ID2 | DRUM REPLACEMENT | DRUM INSTALLATION | OPERATION X | CORRECTION CHART PRINTING | ... | DRUM DATA | SYSTEM DATA A | - | ... |
| ID6 | IMAGE QUALITY ADJUSTMENT | CORRECTION CHART PRINTING | IMAGE QUALITY CORRECTION | - | ... | - | SYSTEM DATA B | - | ... |
| ID5 | DRUM REPLACEMENT | DRUM INSTALLATION | OPERATION X | CORRECTION CHART PRINTING | ... | DRUM DATA | SYSTEM DATA A | - | ... |
| ID1 | IMAGE QUALITY ADJUSTMENT | CORRECTION CHART PRINTING | IMAGE QUALITY CORRECTION | - | ... | - | SYSTEM DATA B | - | ... |
| ID2 | TONER REPLACEMENT | TONER INSTALLATION | COPYING | CORRECTION CHART PRINTING | ... | TONER DATA | - | - | ... |
| ID3 | DRUM REPLACEMENT | DRUM INSTALLATION | OPERATION X | CORRECTION CHART PRINTING | ... | DRUM DATA | SYSTEM DATA A | - | ... |

FIG. 8

INFORMATION PROCESSING APPARATUS, NON-TRANSITORY COMPUTER READABLE MEDIUM STORING PROGRAM, AND INFORMATION PROCESSING METHOD FOR NOTIFYING UNAUTHORIZED OPERATIONS

CROSS-REFERENCE TO RELATED APPLICATIONS

This application is based on and claims priority under 35 USC 119 from Japanese Patent Application No. 2022-035162 filed Mar. 8, 2022.

BACKGROUND

(i) Technical Field

The present invention relates to an information processing apparatus, a non-transitory computer readable medium storing a program, and an information processing method.

(ii) Related Art

JP6690674B discloses an unauthorized access detection system that detects whether or not an access to a business system is an unauthorized access by comparing logs expected from a work application content with actual logs.

SUMMARY

In performing a maintenance work on an information processing apparatus such as a multifunction peripheral by a maintenance worker, a manager user may cause the maintenance worker to perform the maintenance work after checking and approving a content of the maintenance work that is applied for in advance from the maintenance worker.

However, in a case where the maintenance worker performs an unauthorized work that is not applied for on the information processing apparatus after the manager user approves the maintenance work for the maintenance worker, the manager user cannot perceive that the unauthorized work is performed.

Aspects of non-limiting embodiments of the present disclosure relate to an information processing apparatus, a non-transitory computer readable medium storing a program, and an information processing method that enable a manager user to perceive that an unauthorized work that is not applied for is performed in a case where a maintenance worker performs the unauthorized work on the information processing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire information about an item of a maintenance work applied for from a maintenance worker, and refer to information in which the acquired item of the maintenance work is associated with an operation content performed in the maintenance work, and notify a manager user using a predetermined method in a case where an operation other than an operation corresponding to the item of the maintenance work applied for is performed.

BRIEF DESCRIPTION OF THE DRAWINGS

Exemplary embodiment(s) of the present invention will be described in detail based on the following figures, wherein.

DETAILED DESCRIPTION

Figure 1:
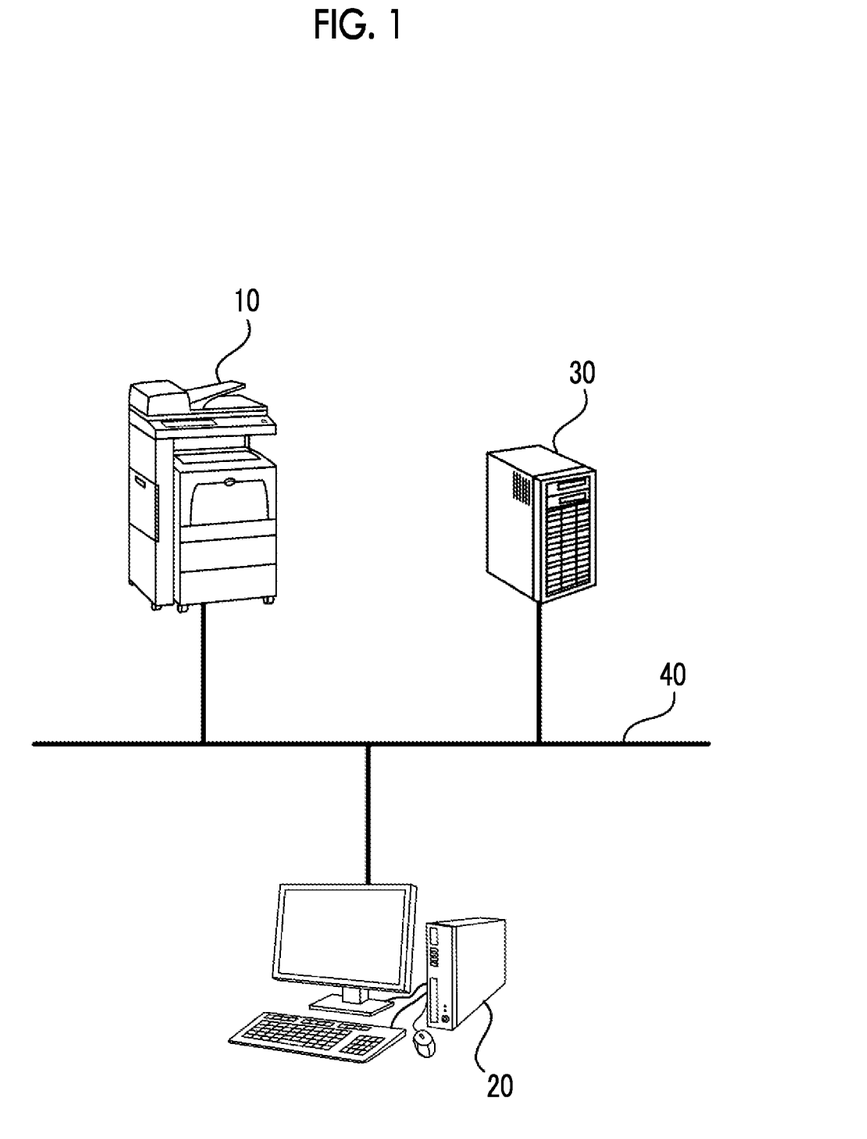
FIG. 1 is a diagram illustrating a system configuration of an image forming system of an exemplary embodiment of the present invention.

Hereinafter, an exemplary embodiment of the present invention will be described in detail with reference to the drawings. FIG. 1 is a diagram illustrating a system configuration of an image forming system of the exemplary embodiment.

As illustrated in FIG. 1, the image forming system of the present exemplary embodiment is configured with an image forming apparatus 10, a terminal apparatus 20, and a data center 30 connected to each other through a network 40.

The terminal apparatus 20 generates printing data and transmits the generated printing data to the image forming apparatus 10 through the network 40. In addition, the terminal apparatus 20 transmits information about an item of a maintenance work that is applied for from a maintenance worker of the image forming apparatus 10 to the image forming apparatus 10 in accordance with an instruction input from a manager user.

The image forming apparatus 10 receives the printing data transmitted from the terminal apparatus 20 and outputs an image corresponding to the printing data on a paper sheet. The image forming apparatus 10 is an apparatus referred to as a so-called multifunction peripheral having a plurality of functions such as a printing function, a scanning function, a copying function, and a facsimile function. In addition, the image forming apparatus 10 approves the maintenance work or cancels the approval for the maintenance worker of the image forming apparatus 10 based on an instruction to approve the maintenance work or cancel the approval received from the terminal apparatus 20. The image forming apparatus 10 is an example of an information processing apparatus according to the exemplary embodiment of the present invention.

The data center 30 is a server managing a work procedure management table that is information in which the item of the maintenance work is associated with an operation content performed in the maintenance work. The data center 30 is an example of an external apparatus according to the exemplary embodiment of the present invention.

Figure 2:
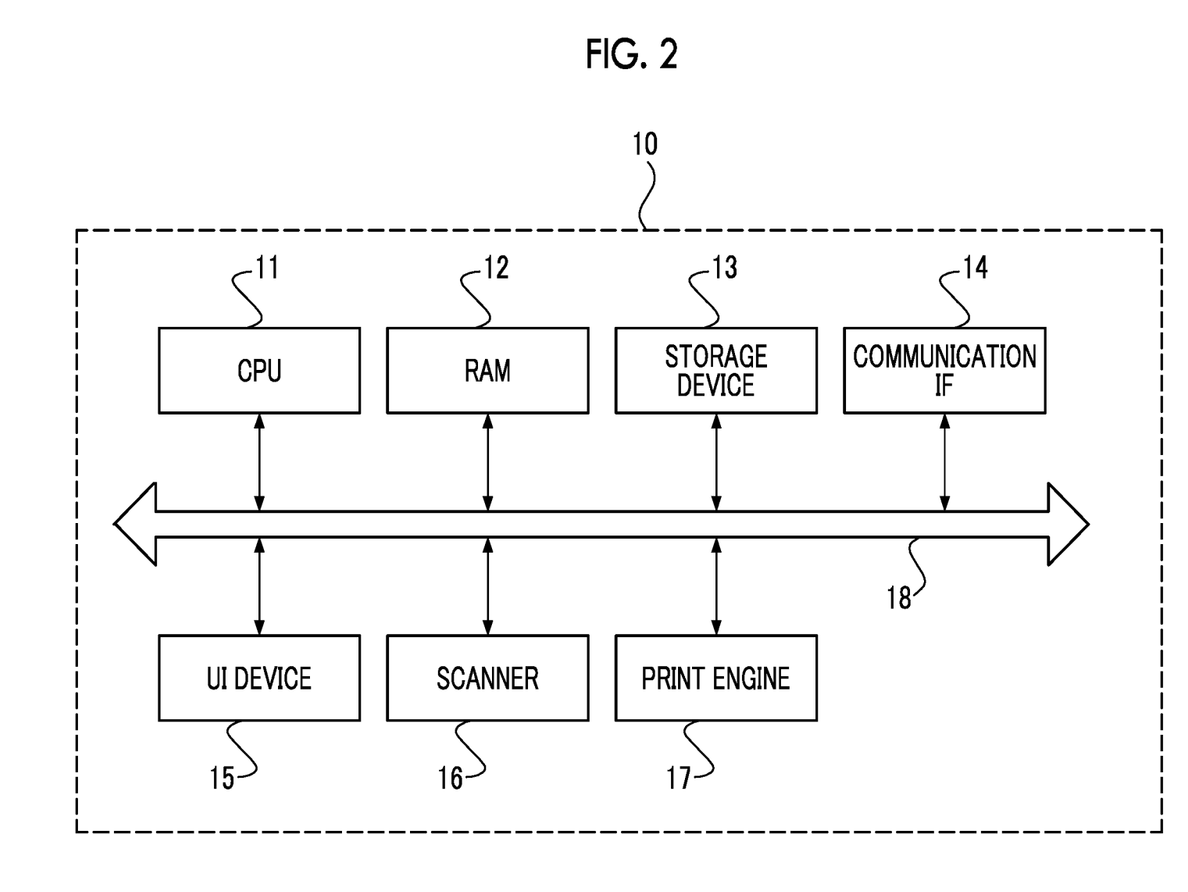
FIG. 2 is a block diagram illustrating a hardware configuration of an image forming apparatus of the exemplary embodiment of the present invention.

Next, a hardware configuration of the image forming apparatus 10 in a data processing system of the present exemplary embodiment is illustrated in FIG. 2.

As illustrated in FIG. 2, the image forming apparatus 10 includes a central processing unit (CPU) 11, a random access memory (RAM) 12, a storage device 13 such as a hard disk drive, a communication interface (abbreviated to IF) 14, a user interface (abbreviated to UI) device 15 including a touch panel or a liquid crystal display and a keyboard, a scanner 16, and a print engine 17.

These constituents are connected to each other via a control bus 18.

The communication IF 14 transmits and receives data to and from the external apparatus or the like via the network 40. The UI device 15 receives an instruction input from a user. The scanner 16 scans an original document loaded in the image forming apparatus 10 as image data. The print engine 17 prints an image on a recording medium such as a printing paper sheet through steps of electrostatic charging, exposure, development, transfer, fixing, and the like.

The CPU 11 is a processor that controls an operation of the image forming apparatus 10 by executing a predetermined process based on a control program stored in the RAM 12 or the storage device 13. In the present exemplary embodiment, while the CPU 11 reads and executes the control program stored in the RAM 12 or the storage device 13, the present invention is not limited thereto. The control program may be provided in the form of a recording on a computer readable recording medium. For example, the program may be provided in the form of a recording on an optical disc such as a compact disc (CD)-read only memory (ROM) and a digital versatile disc (DVD)-ROM or in the form of a recording on a semiconductor memory such as a universal serial bus (USB) memory and a memory card. In addition, the control program may be acquired from the external apparatus via a communication line connected to the communication interface 14.

Figure 3:
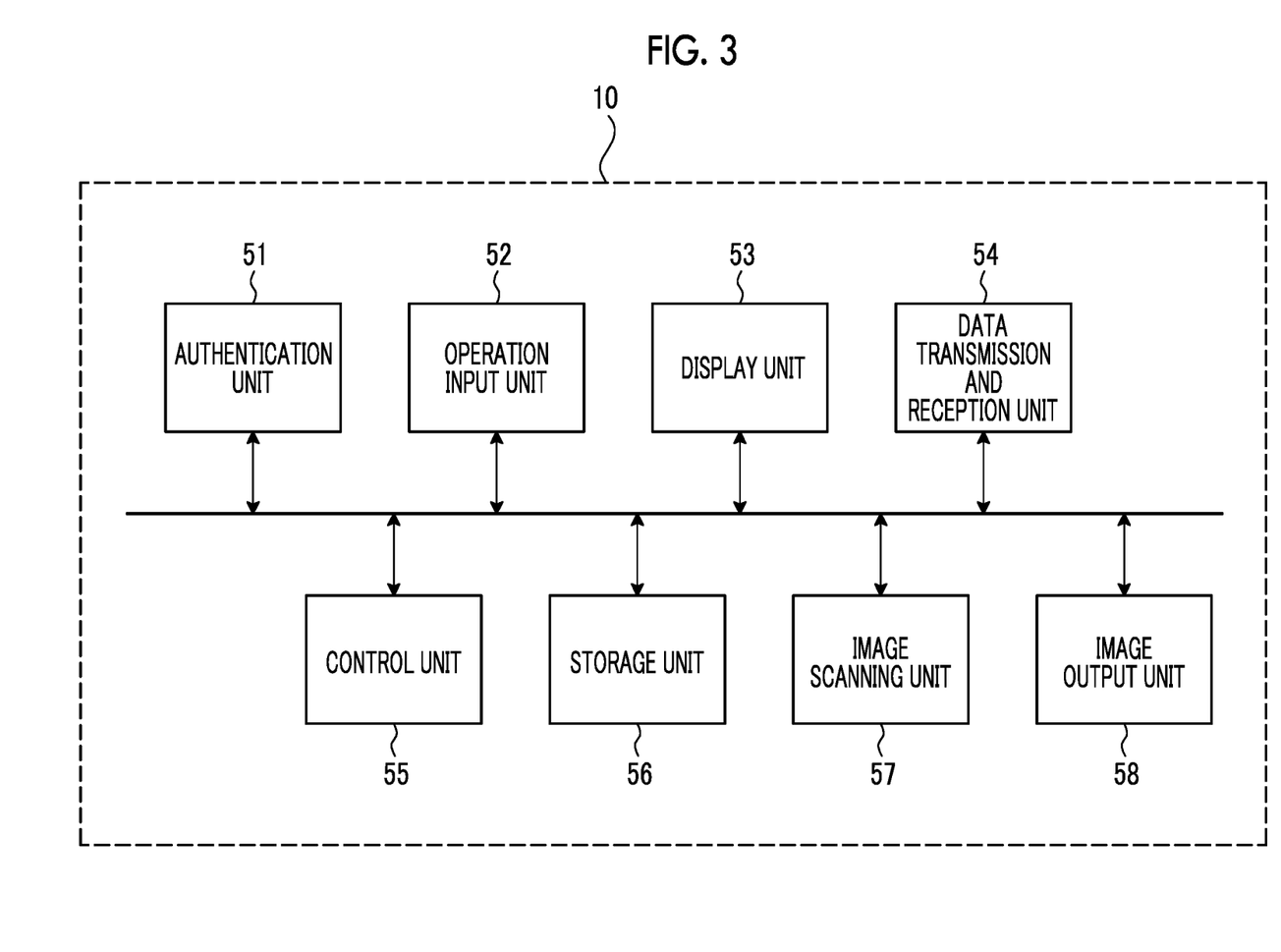
FIG. 3 is a block diagram illustrating a functional configuration of the image forming apparatus of the exemplary embodiment of the present invention.

FIG. 3 is a block diagram illustrating a functional configuration of the image forming apparatus 10 implemented by executing the control program.

As illustrated in FIG. 3, the image forming apparatus 10 of the present exemplary embodiment includes an authentication unit 51, an operation input unit 52, a display unit 53, a data transmission and reception unit 54, a control unit 55, a storage unit 56, an image scanning unit 57, and an image output unit 58.

The authentication unit 51 executes an authentication process for a user who wants to utilize the image forming apparatus 10. The operation input unit 52 inputs information about various operations performed by the user. The display unit 53 is controlled by the control unit 55 and displays various information to the user. The data transmission and reception unit 54 transmits and receives data to and from the external apparatus such as the terminal apparatus 20.

The control unit 55 controls an overall operation of the image forming apparatus 10 and performs a control of scanning an original document image by the image scanning unit 57, a control of outputting the printing data from the image output unit 58, and the like based on the instruction input from the user.

The storage unit 56 stores not only the control program but also data such as the work procedure management table in which information about a work procedure of the maintenance work is managed for each type of maintenance work, and operation logs that are operation history information. The work procedure management table and the operation logs will be described in detail later. The storage unit 56 is an example of a memory according to the exemplary embodiment of the present invention.

The image scanning unit 57 scans the original document image from the loaded original document under control of the control unit 55. The image output unit 58 outputs the image onto the recording medium such as a printing paper sheet under control of the control unit 55.

In the image forming apparatus 10 of the present exemplary embodiment, in performing the maintenance work on the image forming apparatus 10, the maintenance worker applies to the manager user for the item of the maintenance work in advance and performs the maintenance work after obtaining approval from the manager user.

The control unit 55 acquires the information about the item of the maintenance work applied for from the maintenance worker, refers to the information in which the acquired item of the maintenance work is associated with the operation content performed in the maintenance work, and notifies the manager user using a predetermined method in a case where an operation other than an operation corresponding to the item of the maintenance work applied for is performed.

Figure 4:
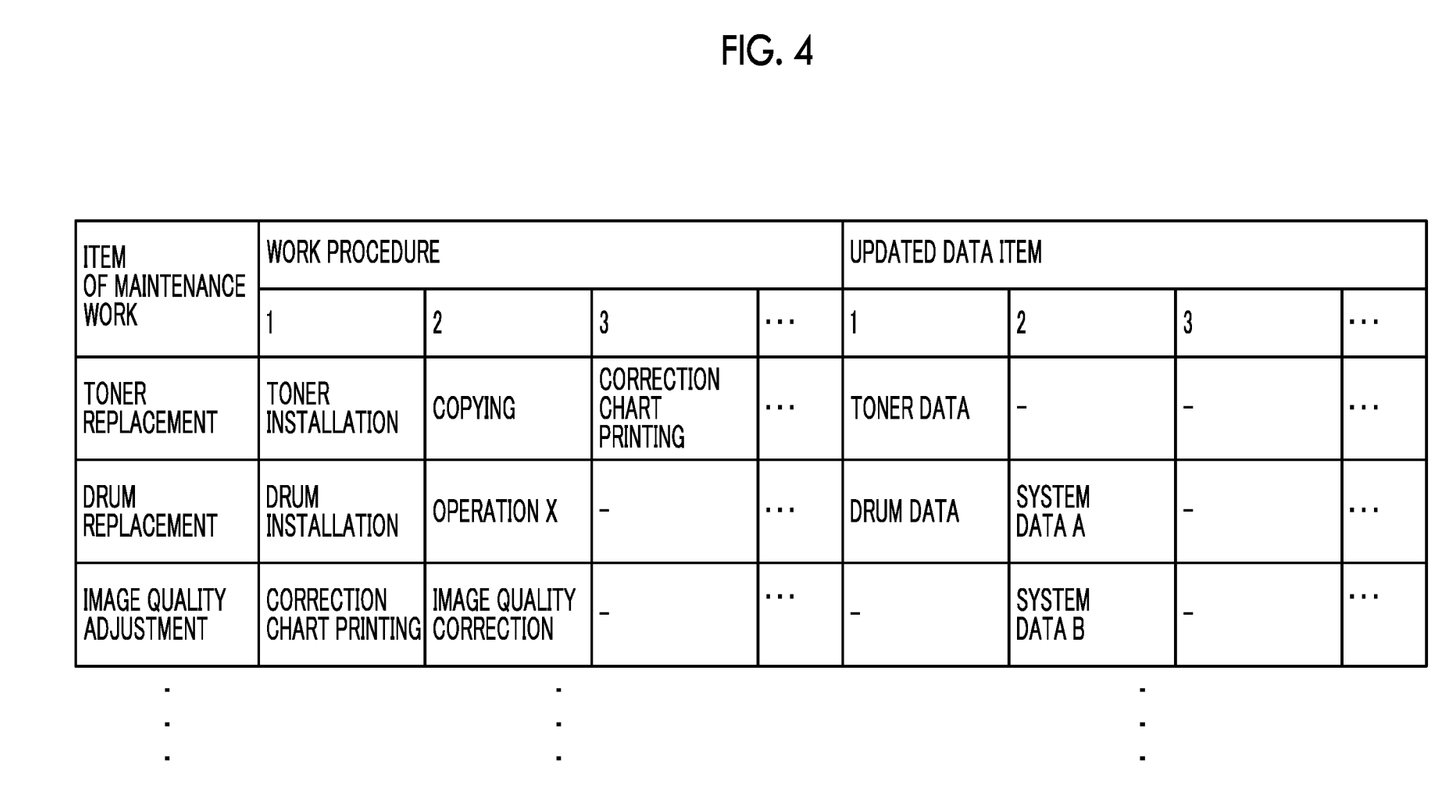
FIG. 4 is a diagram illustrating an example of a work procedure management table managed in the image forming apparatus of the exemplary embodiment of the present invention.

Hereinafter, a process in the image forming apparatus 10 of the present exemplary embodiment will be described in detail. FIG. 4 is a diagram illustrating an example of the work procedure management table managed in the image forming apparatus 10.

In the image forming apparatus 10, the work procedure management table illustrated in FIG. 4 is stored in advance in the storage unit 56. In the work procedure management table, information such a "work procedure" and "updated data item" is managed for each item of the maintenance work.

The "work procedure" is information in which an operation performed in each item of the maintenance work is managed in order of operations. In the work procedure management table in FIG. 4, fourth and subsequent operations are omitted. For example, in the maintenance work of toner replacement, first, new toner installation is performed, second, copying is performed in order to check whether or not printing can be normally performed, and third, a correction chart for performing image quality correction is printed. Here, toner replacement is replacement of a toner cartridge loaded with a toner.

In addition, in the maintenance work of drum replacement, first, new drum installation is performed, and second, an operation X is performed in order to check a state of the new drum. Here, drum replacement is replacement of a drum cartridge including a photosensitive drum.

In addition, in the maintenance work of image quality adjustment, first, a correction chart is printed, and second, image quality correction based on the correction chart is performed.

The "updated data item" is information in which a data item of system data of which a content is updated by each operation in the maintenance work is managed in association with each operation. Here, the system data includes not only various data related to the operation of the image forming apparatus 10 such as a program and setting parameters but also various resource data related to consumables such as a toner, a drum, and a paper sheet. In the work procedure management table in FIG. 4, fourth and subsequent system data is omitted.

For example, in the maintenance work of toner replacement, in a case where new toner installation is performed as the first operation, toner data is updated in the image forming apparatus 10. Here, for example, the toner data is data such as a serial number and a remaining toner amount of the toner cartridge. In a case where copying is performed as the second operation, the system data is not updated. In addition, in a case where the correction chart is printed as the third operation, the system data is not updated.

In addition, in the maintenance work of drum replacement, in a case where new drum installation is performed as the first operation, drum data is updated in the image forming apparatus 10. Here, for example, the drum data is data such as a serial number and a used time of the drum cartridge. In a case where the operation X is performed as the second operation, system data A is updated.

In addition, in the maintenance work of image quality adjustment, in a case where the correction chart is printed as the first operation, the system data is not updated. In a case where the image quality correction is performed as the second operation, system data B is updated.

In performing the maintenance work in the image forming apparatus 10, the maintenance worker applies for the item of the maintenance work and receives the approval of the maintenance work from the manager user of the image forming apparatus 10. The manager user transmits the information about the item of the maintenance work applied for to the image forming apparatus 10 via the terminal apparatus 20. Then, the maintenance worker logs in to the image forming apparatus 10 in performing the maintenance work in the image forming apparatus 10.

Figure 5:
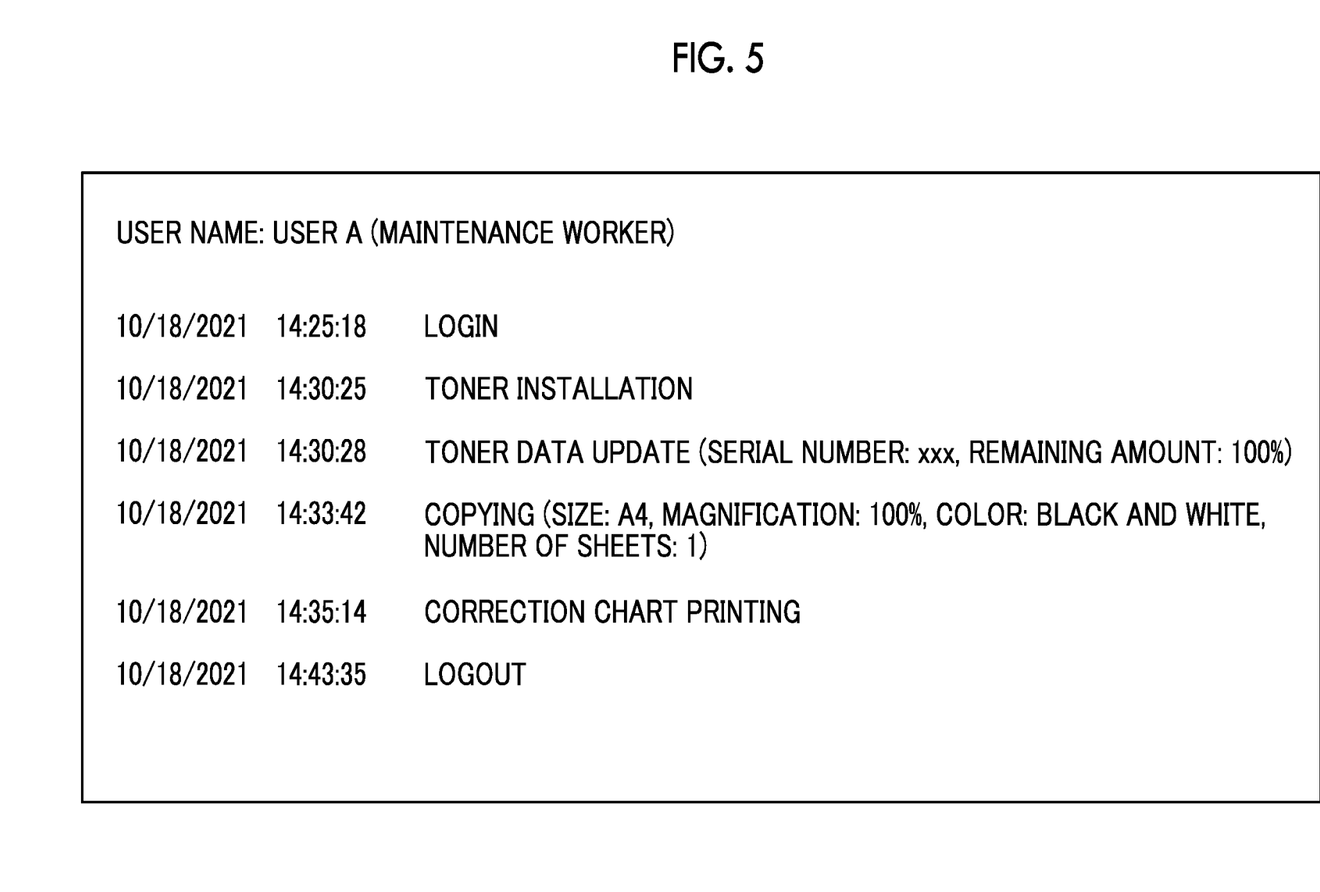
FIG. 5 is a diagram illustrating an example of operation logs acquired in the image forming apparatus of the exemplary embodiment of the present invention and is a diagram illustrating an example of the operation logs in a case where toner replacement is normally performed.

The control unit 55 starts recording the operation logs from a time when the manager user logs in, and stores the operation logs in the storage unit 56. As illustrated in FIG. 5, the operation logs are information in which the operation content executed by the maintenance worker and a changed content of the system data are recorded in time-series order.

The control unit 55 refers to the information about the item of the maintenance work acquired from the manager user via the terminal apparatus 20 and the work procedure management table and, each time the maintenance worker performs an operation, determines whether or not the operation matches the operation corresponding to the item of the maintenance work applied for.

For example, in a case where the toner replacement is applied for as the item of the maintenance work, as illustrated in FIG. 4, first, new toner installation is performed, second, copying is performed, and third, the correction chart is printed in the work procedure of the toner replacement. Each time the maintenance worker performs an operation, the control unit 55 determines whether or not the operation is the operation corresponding to the toner replacement.

FIG. 5 is a diagram illustrating an example of the operation logs acquired in the image forming apparatus 10 and is a diagram illustrating an example of the operation logs in a case where the toner replacement is normally performed. In these operation logs, performing toner installation, copying, and printing of the correction chart in this order and logging out are perceived.

In a case where the maintenance work is normally performed, the control unit 55 finishes the process without performing notification or the like of an unauthorized operation.

Figure 6:
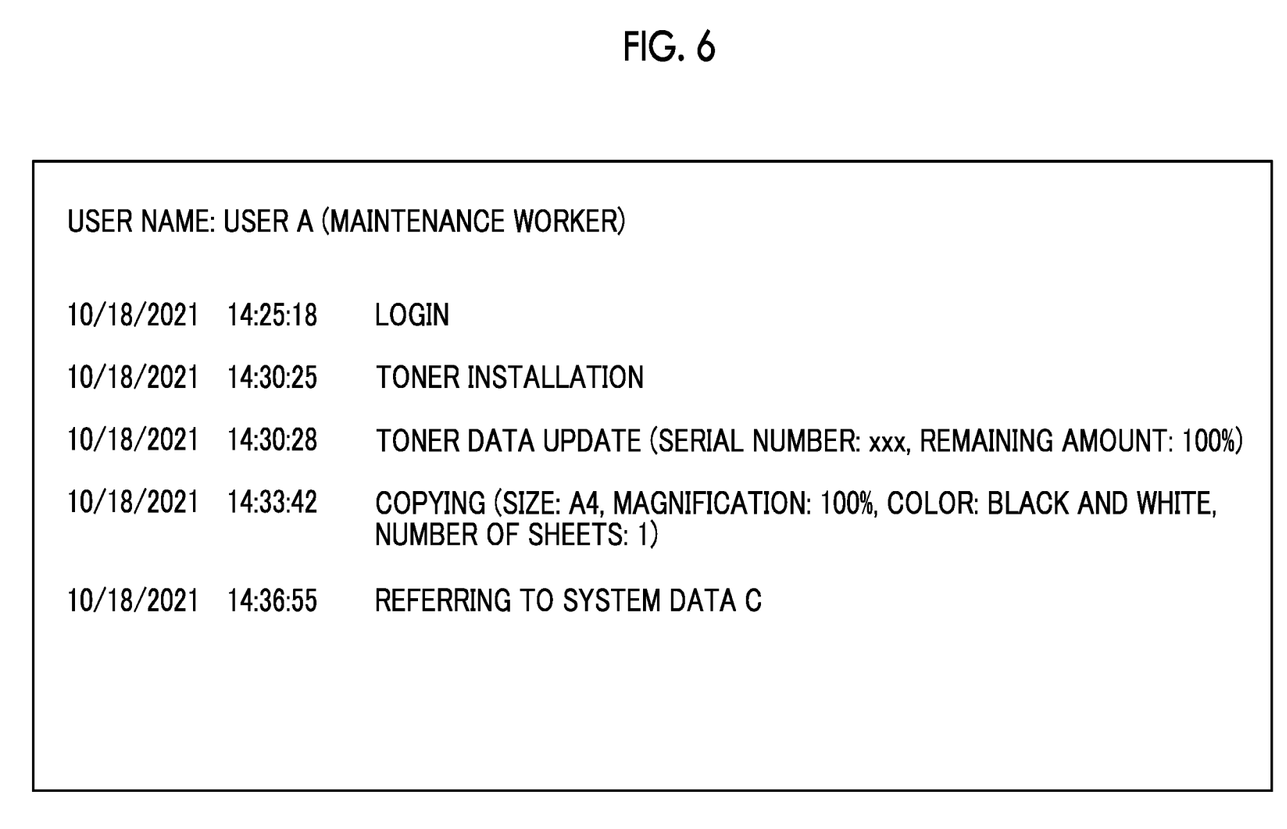
FIG. 6 is a diagram illustrating an example of the operation logs acquired in the image forming apparatus of the exemplary embodiment of the present invention and is a diagram illustrating an example of the operation logs in a case where an unauthorized operation is performed in the toner replacement.

FIG. 6 is a diagram illustrating an example of the operation logs acquired in the image forming apparatus 10 and is a diagram illustrating an example of the operation logs in a case where an unauthorized operation is performed in the toner replacement. In these operation logs, system data C is referred to as an operation not described in the work procedure management table after toner installation and copying.

In this case, in a stage where the system data C is referred to, the control unit 55 notifies the manager user using the predetermined method. Here, "notification using the predetermined method" is not particularly limited and can be performed in various aspects. For example, an email indicating that an unauthorized operation is performed may be transmitted to the manager user, or a display indicating that an unauthorized operation is performed or an alert sound may be output in the terminal apparatus 20 used by the manager user.

For the determination as to whether or not the operation matches the operation corresponding to the item of the maintenance work applied for, the determination may be performed based on only the operation as described above, or the determination may be performed including the content of the system data of which the content is updated by the operation. For example, in performing toner installation, the toner data is updated. In a case where the remaining toner amount is not 100% in the updated toner data, the installed toner may be considered to be not new, and a determination that an authorized operation is not performed may be made.

In addition, in a case where the operation other than the operation corresponding to the item of the maintenance work applied for is performed, the control unit 55 may prohibit the operation other than the operation corresponding to the item of the maintenance work applied for.

In addition, in a case where the operation other than the operation corresponding to the item of the maintenance work applied for is performed, the control unit 55 may prohibit all operations for the image forming apparatus 10.

Prohibiting a specific operation in the control unit 55 means permitting execution of at least an operation performed via software in the operation of the maintenance work. For example, various hardware operations such as toner installation and drum installation may be managed in the control unit 55 or may not be managed.

In a case of managing the hardware operations in the control unit 55, for example, a key with which locking and unlocking of a housing of the image forming apparatus 10 can be controlled by software may be provided. Accordingly, the control unit 55 can enable the maintenance worker to physically operate the hardware inside the image forming apparatus 10 by unlocking the housing with the key in a state where the operation is not prohibited. In addition, the control unit 55 can prevent the maintenance worker from physically operating the hardware inside the image forming apparatus 10 by locking the housing with the key in a state where the operation is prohibited.

In addition, for example, the control unit 55 may acquire the work procedure management table from the external apparatus such as the data center 30 instead of storing the work procedure management table in advance in the image forming apparatus 10. In this case, the work procedure management table may be information that is updated in the data center 30 based on information about an operation actually performed in the image forming apparatus 10 or another image forming apparatus in each item of the maintenance work.

In addition, the work procedure management table may be information that is updated in the data center 30 to include an operation of the same content performed in a plurality of image forming apparatuses as the operation performed in each item of the maintenance work in a case where the operation of the same content is performed in the plurality of image forming apparatuses in each item of the maintenance work.

Figure 7:
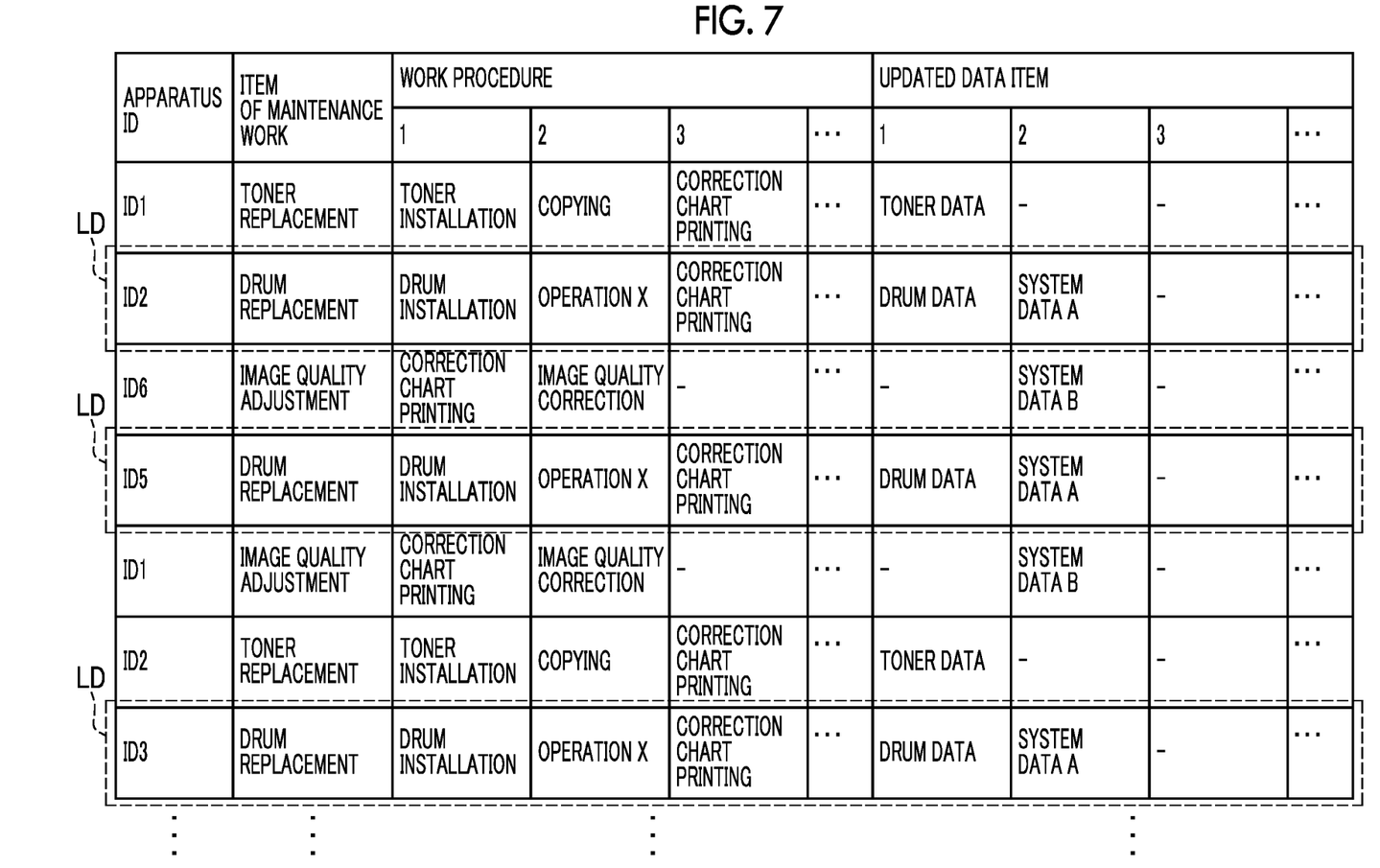
FIG. 7 is a diagram illustrating an example of an operation log table acquired in a data center.
Figure 8:
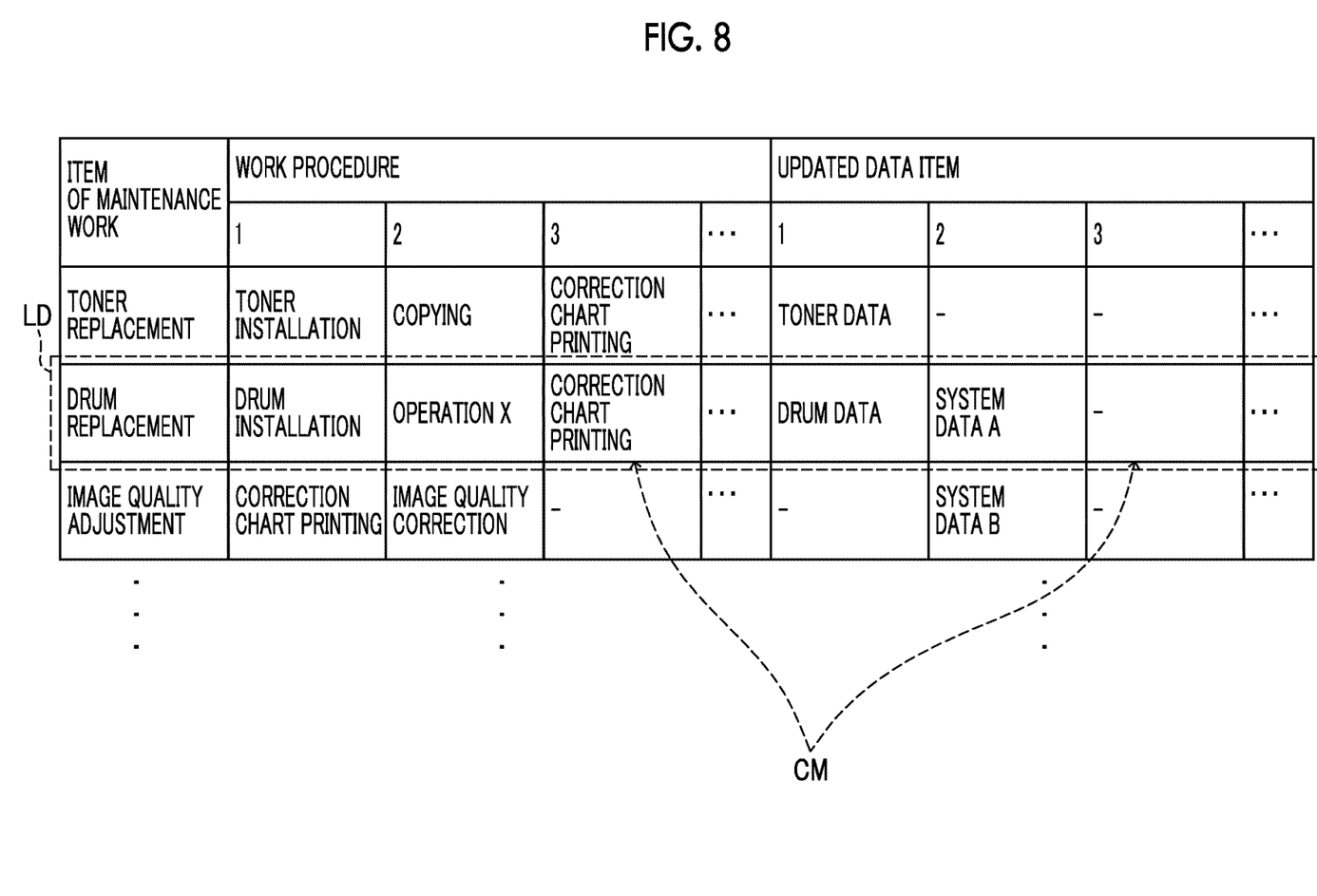
FIG. 8 is a diagram illustrating an example of the work procedure management table managed in the data center.

As an example, the update of the work procedure management table in the data center 30 is performed as follows. FIG. 7 is a diagram illustrating an example of an operation log table acquired in the data center 30. FIG. 8 is a diagram illustrating an example of the work procedure management table managed in the data center 30.

Here, an item of drum replacement will be described as an example. For the item of drum replacement in the work procedure management table, the first operation is assumed to be drum installation, and the second operation is assumed to be the operation X as illustrated in FIG. 4.

The data center 30 acquires the operation logs at a time of the maintenance work from not only the image forming apparatus 10 but also another image forming apparatus connected to the network 40. As illustrated in FIG. 7, in the data center 30, contents of the operation logs are arranged in the same format as the work procedure management table and are recorded as an operation log table in association with an apparatus ID indicating identification information of the image forming apparatus.

The data center 30 refers to the operation log table and updates the work procedure management table to include the operation of the same content in a case where the operation of the same content is performed in the plurality of image forming apparatuses in each item of the maintenance work.

For example, as illustrated in an item LD in FIG. 7, in three different image forming apparatuses, drum installation is performed as the first operation, the operation X is performed as the second operation, and then, the correction chart is printed as the third operation at a time of drum replacement.

In a case where the operation of the same content is performed in the plurality of image forming apparatuses, the data center 30 adds a content of correction chart printing to third columns CM of "work procedure" and "updated data item" in the item of drum replacement in the work procedure management table as illustrated in the item LD in FIG. 8.

A condition under which the work procedure management table is updated is not limited to a case where the operation of the same content is performed in a predetermined number of image forming apparatuses or more, and may be a case where a predetermined operation of the same content is performed a predetermined number of times or more in one image forming apparatus.

In addition, the work procedure management table may be information that is editable by the maintenance worker by receiving approval of the manager user.

Figure 9:
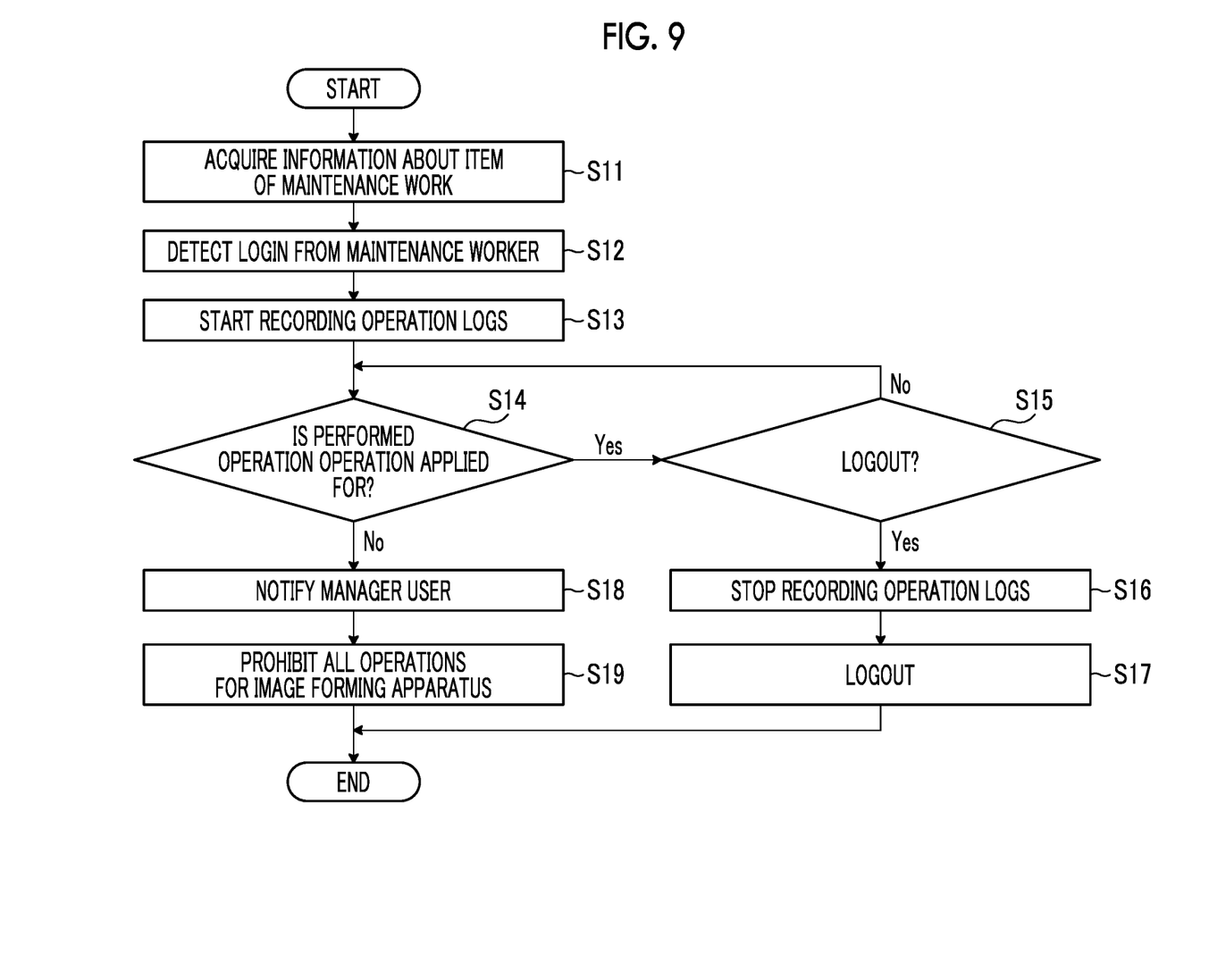
FIG. 9 is a flowchart for describing a flow of process in performing a maintenance work by a maintenance worker in the image forming apparatus of the exemplary embodiment of the present invention.

Next, a flow of process in performing the maintenance work by the maintenance worker in the image forming apparatus 10 of the present exemplary embodiment will be described with reference to the flowchart in FIG. 9.

In step S11, the control unit 55 acquires the information about the item of the maintenance work, which is applied for from the maintenance worker of the image forming apparatus 10, from the manager user via the terminal apparatus 20.

Next, in a case where a login from the maintenance worker approved by the manager user is detected in step S12, the control unit 55 starts recording the operation logs in step S13.

Next, in step S14, the control unit 55 determines whether or not the operation performed on the image forming apparatus 10 by the maintenance worker is the operation applied for. Here, the "operation applied for" includes not only the operation indicated in the information about the item of the maintenance work acquired from the manager user but also an operation normally performed at the time of the maintenance work such as a restart, a power-ON, a power-OFF, a login, and a logout of the image forming apparatus 10.

In step S14, in a case where a determination that the operation performed by the maintenance worker is the operation applied for is made, the control unit 55 determines whether or not the operation determined in step S14 is the logout in step S15.

In step S15, in a case where a determination that the operation determined in step S14 is not the logout is made, the control unit 55 transitions to step S14 and then, repeats step S14 and step S15 for each operation until the maintenance worker performs the logout.

In step S15, in a case where a determination that the operation determined in step S14 is the logout is made, the control unit 55 stops recording the operation logs in step S16, performs a logout process of the maintenance work in step S17, and finishes the process.

In addition, in step S14, in a case where a determination that the operation performed by the maintenance worker is not the operation applied for is made, the control unit 55 notifies the manager user in step S18.

In addition, the control unit 55 prohibits all operations for the image forming apparatus 10 in step S19 and finishes the process.

Modification Example

While the image forming system of the exemplary embodiment of the present invention is described above, the present invention is not limited to the exemplary embodiment and cam be appropriately changed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, while the exemplary embodiment is described using a case of applying the present invention to the image forming apparatus, the present invention is not limited thereto and can be applied to various information processing apparatuses.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
acquire information about a maintenance work list applied from a maintenance worker and approved by a manager user, wherein the maintenance work list is associated with a plurality of approved operations that are arranged in an approved sequence to be performed on the information processing apparatus;
detect a login by the maintenance worker to the information processing apparatus;
record, in an operation log, operations and their execution sequence performed by the maintenance worker on the information processing apparatus after the login is detected;
determine that an operation most recently recorded in the operation log is an unauthorized operation in response to determining that the operation is different from the expected approved operation at the current stage in the approved sequence of the maintenance work list; and
output a notification indicating the unauthorized operation was performed by the maintenance worker in a case where the unauthorized operation is determined.

2. The information processing apparatus according to claim 1, wherein the processor is configured to:
in a case where the operation other than the operation corresponding to the item of the maintenance work applied for is performed, prohibit the operation other than the operation corresponding to the item of the maintenance work applied for.

3. The information processing apparatus according to claim 2, wherein the processor is configured to:
in a case where the operation other than the operation corresponding to the item of the maintenance work applied for is performed, prohibit all operations for the information processing apparatus.

4. The information processing apparatus according to claim 3, wherein the processor is configured to:
acquire the information in which the item of the maintenance work is associated with the operation content performed in the maintenance work from an external apparatus, and
the information in which the item of the maintenance work is associated with the operation content performed in the maintenance work is information that is updated in the external apparatus based on information about an operation actually performed in the information processing apparatus or another information processing apparatus in each item of the maintenance work.

5. The information processing apparatus according to claim 4,
wherein the information in which the item of the maintenance work is associated with the operation content performed in the maintenance work is information that is updated in the external apparatus to include an operation of the same content performed in a plurality of information processing apparatuses as an operation performed in each item of the maintenance work in a case where the operation of the same content is performed in the plurality of information processing apparatuses in each item of the maintenance work.

6. The information processing apparatus according to claim 5,
wherein the information in which the item of the maintenance work is associated with the operation content performed in the maintenance work is information that is editable by the maintenance worker by receiving approval of the manager user.

7. The information processing apparatus according to claim 3,
wherein the information in which the item of the maintenance work is associated with the operation content performed in the maintenance work is information that is editable by the maintenance worker by receiving approval of the manager user.

8. The information processing apparatus according to claim 4,
wherein the information in which the item of the maintenance work is associated with the operation content performed in the maintenance work is information that is editable by the maintenance worker by receiving approval of the manager user.

9. The information processing apparatus according to claim 2, wherein the processor is configured to:
acquire the information in which the item of the maintenance work is associated with the operation content performed in the maintenance work from an external apparatus, and
the information in which the item of the maintenance work is associated with the operation content performed in the maintenance work is information that is updated in the external apparatus based on information about an operation actually performed in the information processing apparatus or another information processing apparatus in each item of the maintenance work.

10. The information processing apparatus according to claim 9,
wherein the information in which the item of the maintenance work is associated with the operation content performed in the maintenance work is information that is updated in the external apparatus to include an operation of the same content performed in a plurality of information processing apparatuses as an operation performed in each item of the maintenance work in a case where the operation of the same content is performed in the plurality of information processing apparatuses in each item of the maintenance work.

11. The information processing apparatus according to claim 10,
wherein the information in which the item of the maintenance work is associated with the operation content performed in the maintenance work is information that is editable by the maintenance worker by receiving approval of the manager user.

12. The information processing apparatus according to claim 9,
wherein the information in which the item of the maintenance work is associated with the operation content performed in the maintenance work is information that is editable by the maintenance worker by receiving approval of the manager user.

13. The information processing apparatus according to claim 2,
wherein the information in which the item of the maintenance work is associated with the operation content performed in the maintenance work is information that is editable by the maintenance worker by receiving approval of the manager user.

14. The information processing apparatus according to claim 1, wherein the processor is configured to:
acquire the information in which the item of the maintenance work is associated with the operation content performed in the maintenance work from an external apparatus, and
the information in which the item of the maintenance work is associated with the operation content performed in the maintenance work is information that is updated in the external apparatus based on information about an operation actually performed in the information processing apparatus or another information processing apparatus in each item of the maintenance work.

15. The information processing apparatus according to claim 14,
wherein the information in which the item of the maintenance work is associated with the operation content performed in the maintenance work is information that is updated in the external apparatus to include an operation of the same content performed in a plurality of information processing apparatuses as an operation performed in each item of the maintenance work in a case where the operation of the same content is performed in the plurality of information processing apparatuses in each item of the maintenance work.

16. The information processing apparatus according to claim 15,
wherein the information in which the item of the maintenance work is associated with the operation content performed in the maintenance work is information that is editable by the maintenance worker by receiving approval of the manager user.

17. The information processing apparatus according to claim 14,
wherein the information in which the item of the maintenance work is associated with the operation content performed in the maintenance work is information that is editable by the maintenance worker by receiving approval of the manager user.

18. The information processing apparatus according to claim 1,
wherein the information in which the item of the maintenance work is associated with the operation content performed in the maintenance work is information that is editable by the maintenance worker by receiving approval of the manager user.

19. A non-transitory computer readable medium storing a program causing a computer to execute a process comprising:
acquiring information about a maintenance work list applied from a maintenance worker and approved by a manager user, wherein the maintenance work list is associated with a plurality of approved operations that are arranged in an approved sequence to be performed on the information processing apparatus;
detecting a login by the maintenance worker to the information processing apparatus;
recording, in an operation log, operations and their execution sequence performed by the maintenance worker on the information processing apparatus after the login is detected;
determining that an operation most recently recorded in the operation log is an unauthorized operation in response to determining that the operation is different from the expected approved operation at the current stage in the approved sequence of the maintenance work list; and
outputting a notification indicating the unauthorized operation was performed by the maintenance worker in a case where the unauthorized operation is determined.

20. An information processing method comprising:
acquiring information about a maintenance work list applied from a maintenance worker and approved by a manager user, wherein the maintenance work list is associated with a plurality of approved operations that are arranged in an approved sequence to be performed on the information processing apparatus;
detecting a login by the maintenance worker to the information processing apparatus;
recording, in an operation log, operations and their execution sequence performed by the maintenance worker on the information processing apparatus after the login is detected;
determining that an operation most recently recorded in the operation log is an unauthorized operation in response to determining that the operation is different from the expected approved operation at the current stage in the approved sequence of the maintenance work list; and
outputting a notification indicating the unauthorized operation was performed by the maintenance worker in a case where the unauthorized operation is determined.

* * * * *